(12) United States Patent
Nakajima et al.

(10) Patent No.: US 10,300,943 B2
(45) Date of Patent: May 28, 2019

(54) VEHICLE STEERING APPARATUS

(71) Applicant: HONDA MOTOR CO., LTD., Tokyo (JP)

(72) Inventors: Kenichi Nakajima, Saitama (JP); Kenichi Kirihara, Saitama (JP); Katsuhiro Saito, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 15/684,022

(22) Filed: Aug. 23, 2017

(65) Prior Publication Data

US 2018/0057041 A1 Mar. 1, 2018

(30) Foreign Application Priority Data

Aug. 24, 2016 (JP) .................................. 2016-163527

(51) Int. Cl.
*B62D 5/04* (2006.01)
*B62D 6/10* (2006.01)
*B62D 5/00* (2006.01)
*G01L 5/22* (2006.01)

(52) U.S. Cl.
CPC ............ *B62D 5/0466* (2013.01); *B62D 5/003* (2013.01); *B62D 5/006* (2013.01); *B62D 5/0463* (2013.01); *B62D 5/0481* (2013.01); *B62D 6/10* (2013.01); *G01L 5/221* (2013.01)

(58) Field of Classification Search
CPC ...... B62D 5/0466; B62D 5/001; B62D 5/003; B62D 5/005; B62D 5/006
See application file for complete search history.

(56) References Cited

U.S. PATENT DOCUMENTS 6,470,993 B1 * 10/2002 Matsuda ................ B62D 3/126
180/444
2019/0023318 A1 * 1/2019 Mitsuishi ............... B62D 6/008

FOREIGN PATENT DOCUMENTS

JP 7-117690 5/1995

* cited by examiner

*Primary Examiner* — Kevin Hurley
(74) *Attorney, Agent, or Firm* — Rankin, Hill & Clark LLP (57) ABSTRACT

Provided is a vehicle steering apparatus capable of predicting failure while protecting a clutch device. The vehicle steering apparatus includes a turning device for turning steered wheels of a vehicle, and a steering device having a steering reaction force actuator for providing reaction force to assist user's steering of a steering wheel. A clutch device is provided between the steering device and the turning device to perform operation to mechanically cause a connection state or a disconnection state between the steering device and the turning device. Further, between the steering reaction force actuator and the clutch device, a mechanical fuse is arranged that twists and deforms by an input of an excessive load to prevent the load from being transmitted to the clutch device. A scribing line is drawn on the side surface portion of this mechanical fuse.

6 Claims, 7 Drawing Sheets

VEHICLE STEERING APPARATUS

CROSS REFERENCE TO RELATED APPLICATION

This application claims the priority of Japanese Patent Application No. 2016-163527, filed on Aug. 24, 2016, the entire specification, claims and drawings of which are incorporated herewith by reference.

BACKGROUND OF THE INVENTION

Field of the Invention

The present invention is related to a vehicle steering apparatus.

Description of the Related Arts

As a known vehicle steering apparatus, there is one that is applied to electric power steering (for example, refer to Patent Document 1 (JP H07-117690 A)).

In such a vehicle steering apparatus, a steering shaft connected with a steering wheel on an input shaft side and a driven gear on an output shaft side are provided with a key way and a groove, respectively, the key way and the groove facing each other. A crescent key is inserted in-between the key way and the groove, and the steering shaft and the driven gear are connected through this key.

When a shear load higher than a certain value acts between the steering shaft and the driven gear, this key will break.

When the key breaks, the connection state between the input side shaft and the output side shaft is released so that component elements, such as the gear connected to the output side shaft, are protected against an excessive input torque.

SUMMARY OF THE INVENTION

An aspect of the present invention provides a vehicle steering apparatus indicating whether or not a load (fatigue) has been accumulated in a pass for transmitting steering force. Consequently, it is possible to know an overload state until the key breaks.

Accordingly, the vehicle steering apparatus can indicate possibility of occurrence of failure to replace a component before it breaks.

An aspect of the present invention provides a vehicle steering apparatus capable of protecting a clutch device.

An aspect of the present invention provides a vehicle steering apparatus, comprising:

a turning device that turns steered wheels of a vehicle;

a steering device including a steering reaction force actuator that applies a reaction force to user's steering of a steering wheel;

a clutch device that performs operation to mechanically cause a connection state or a disconnection state between the steering device and the turning device; and a torque limiter disposed between the steering reaction force actuator and the clutch device.

According to the present invention, a vehicle steering apparatus capable of protecting a clutch device can be provided.

PREFERRED EMBODIMENT OF THE INVENTION

An embodiment of the present invention will be described below, referring to the drawings.

Outline of Steer-by-Wire

Figure 1:
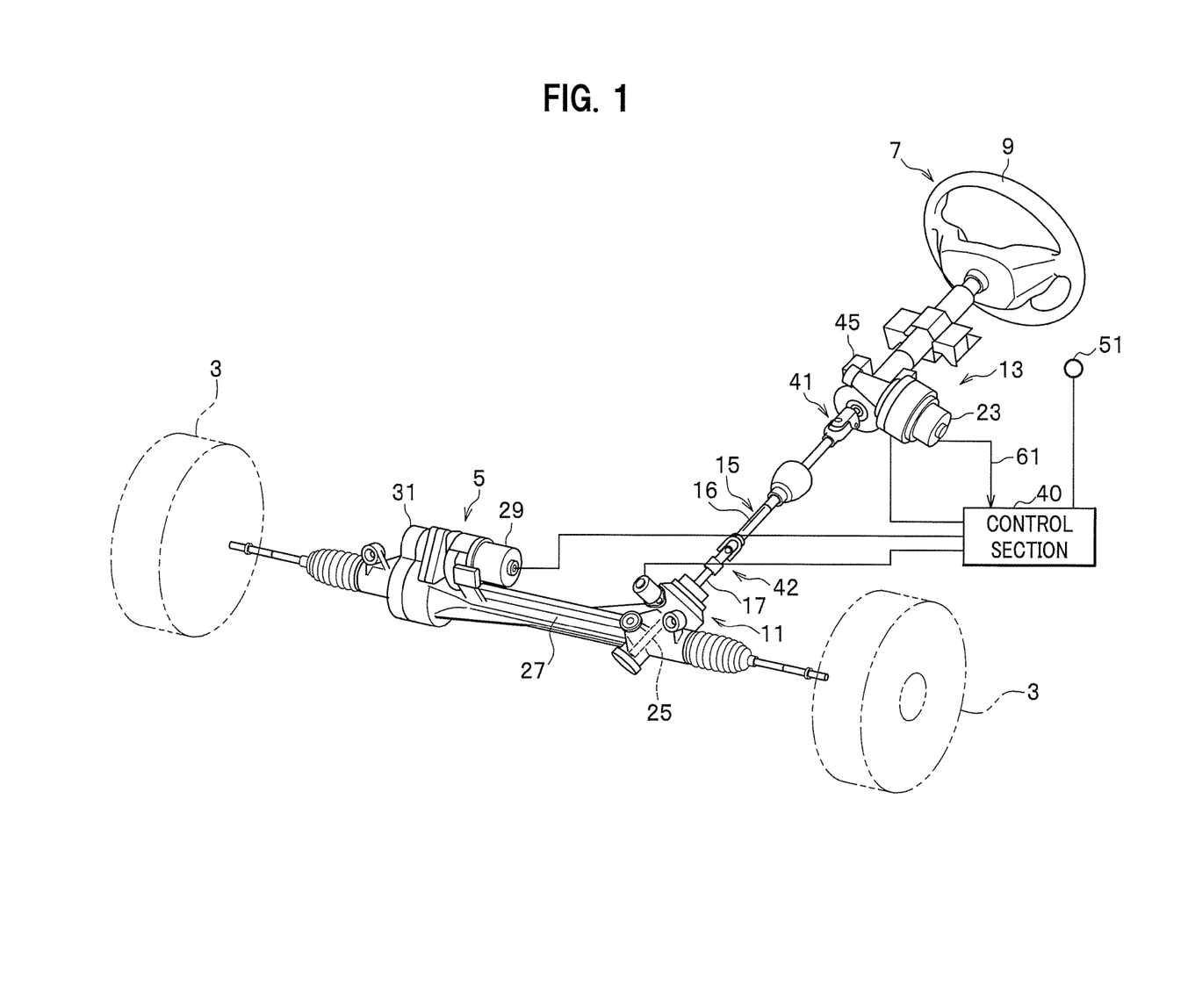
FIG. 1 is a perspective view showing the entire configuration of a vehicle steering apparatus in an embodiment of the present invention.

FIG. 1 is a perspective view showing the entire configuration of a vehicle steering apparatus according to a present embodiment.

A vehicle 1 in the present embodiment includes a turning device 5 disposed on a vehicle body to turn steered wheels 3, 3, a steering device 7 for steering by a user using a steering wheel 9, and a clutch device 11.

The turning device 5 is provided with a turning shaft 25, a rack shaft 27, a turning motor 29, and a turning mechanism 31 for converting the rotational force of the turning motor 29 through a belt and the like into a linear motion in the axial direction of the rack shaft 27.

Further, the steering device 7 forms a column shaft portion, and is provided with a steering shaft 17 for transmitting the steering of the steering wheel 9 and a steering reaction force actuator 13 for applying a steering reaction force to this column shaft portion. The steering shaft 17 transmits the rotation of the steering wheel 9 to the clutch device 11.

The steering reaction force actuator (column-side actuator) 13 includes a steering reaction force motor 23 and a steering angle sensor 45. The steering reaction force actuator 13 is configured to provide a reaction force against steering of the steering wheel 9.

Clutch Mechanism

Further, the clutch device 11 is configured to perform operation to mechanically make the steering device 7 and the turning device 5 into a connection state or a disconnection state.

Figure 2:
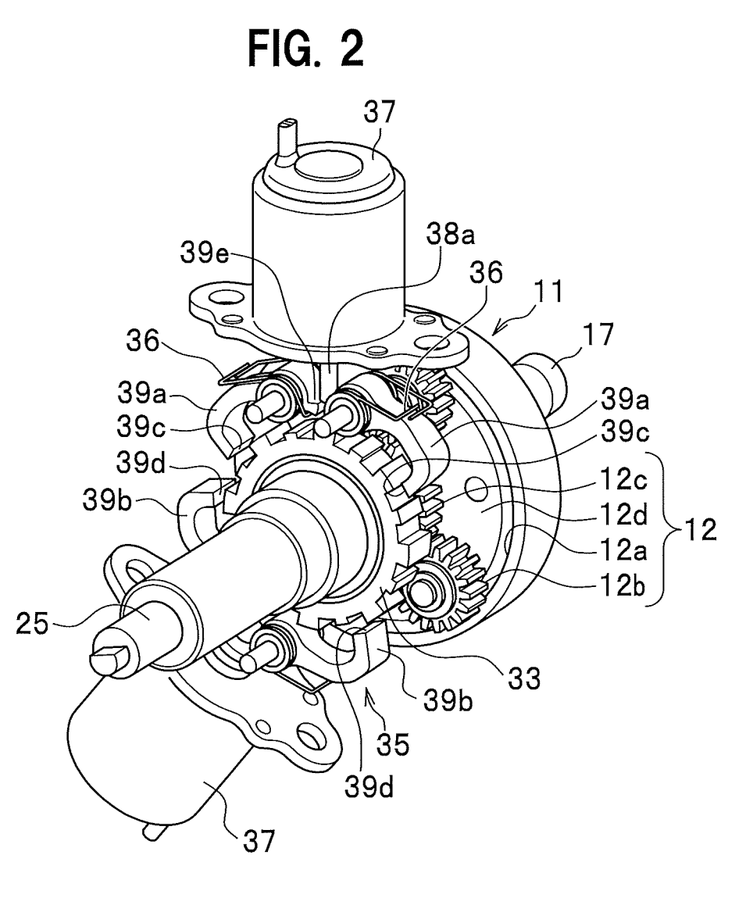
FIG. 2 is a perspective view of the inner portion of a clutch, illustrating the configuration of a clutch device used for the vehicle steering apparatus in the embodiment.
Figure 3:
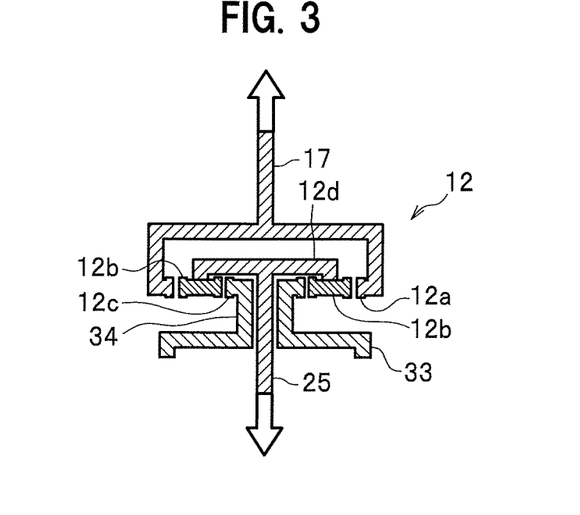
FIG. 3 is a skeleton view of a planetary gear mechanism used for the clutch device in the embodiment.

FIG. 2 is a perspective view of the inner portion of a clutch, illustrating the configuration of the clutch device 11 used for the vehicle steering apparatus in the present embodiment. FIG. 3 is a skeleton view of a planetary gear mechanism 12 used for the clutch device 11 in the present embodiment.

The clutch device 11 is mainly provided with the planetary gear mechanism 12 and a locking device 35.

The planetary gear mechanism 12 is configured mainly with a ring gear 12a, planetary gears 12b, a sun gear 12c, and a planetary carrier member 12d.

The ring gear 12a is fixed to the side end portion of the steering shaft 17, and is arranged such as to rotate integrally with the steering shaft 17. The sun gear 12c is arranged such as to be rotatable around a rotation shaft that is coaxial with the turning shaft 25.

Plural planetary gears 12b are arranged at certain intervals around the sun gear 12c, such as to engage with the sun gear 12c and the ring gear 12a.

These plural planetary gears 12b are axially supported such as to be rotatable with respect to the planetary carrier member 12d that rotates integrally with the turning shaft 25.

Consequently, in a state that the sun gear 12c is rotatable, the rotation of the steering wheel 9 is not transmitted to the turning shaft 25.

By fixing the sun gear 12c, a rotational force that is input from the steering shaft 17 is transmitted through the planetary gears 12b and the planetary carrier member 12d to the turning shaft 25, being decelerated by a certain reduction gear ratio.

Locking Device

Figure 4:
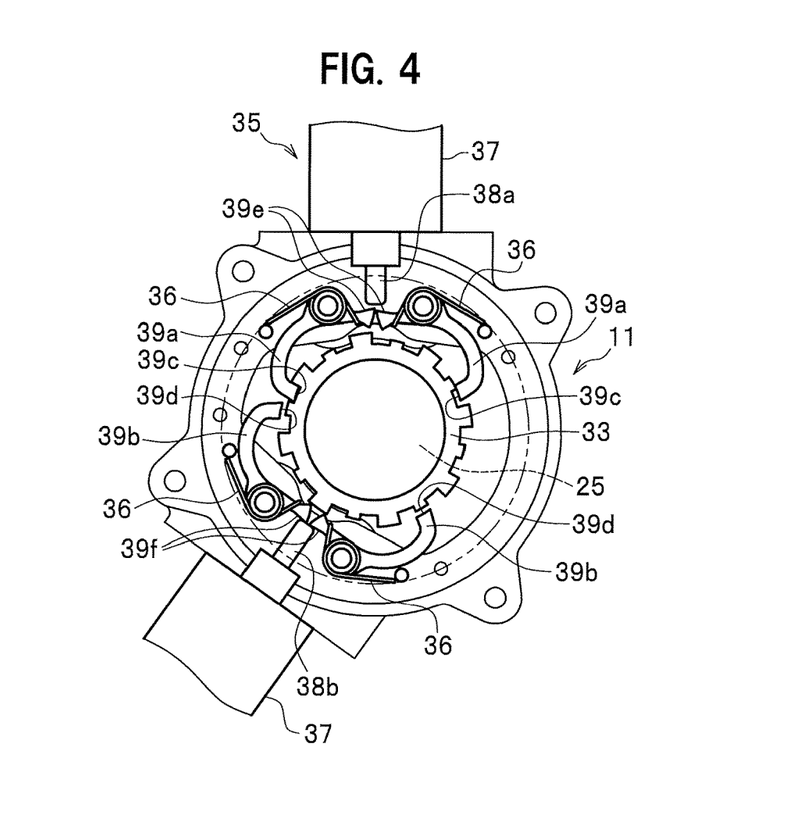
FIG. 4 is a schematic plan view showing a state that locking levers are engaged with or separated from a locking gear in the clutch device in the embodiment.

FIG. 4 is a schematic plan view showing a state that locking levers 39a, 39b are engaged with or separated from a locking gear 33 in the locking device 35 used for the clutch device 11 in the present embodiment.

The clutch device 11 in the present embodiment is provided with the locking device 35 that prohibits or allows the rotation of the locking gear 33.

In other words, the locking device 35 includes the locking gear 33, electromagnetic solenoids 37, 37 for driving a locking pin 38a or 38b, two pairs of locking levers 39a, 39a, and 39b, 39b as engaging members, and spring members 36, 36 as urging members.

The locking gear 33 has an external gear shape and is arranged such as to be integral with the sun gear 12c through a connecting tube section 34 (see FIG. 3).

The locking levers 39a, 39b have curved hook shapes, and the tip ends of the hooks are provided with engaging claw portions 39c, 39d having a size engageable with a tooth groove of the locking gear 33.

The respective pairs of locking levers 39a, 39a and 39b, 39b are rotatably and axially supported such that the engaging claw portions 39c, 39c and the engaging claw portions 39d, 39d move in a direction to move closer to each other and move farther from each other.

Further, the spring members 36, 36 urge the engaging claw portions 39c, 39c and 39d, 39d of these respective pairs of locking levers 39a, 39b, toward a direction to engage with tooth grooves of the locking gear 33.

Still further, the tip end surfaces of the respective locking pins 38a, 38b of the electromagnetic solenoids 37, 37 are in contact with the rear end portions 39e, 39f of these locking levers 39a, 39b.

When the electromagnetic solenoids 37, 37 are driven, the respective locking pins 38a, 38b press the rear end portions 39e, 39f of the engaging claw portions 39c, 39c and 39d, 39d.

By being pressed by respective locking pins 38a, 38b, the respective pairs of the locking levers 39a, 39a and 39b, 39b pivot, with the portions axially supported as the rotational centers, such as to increase the distances between the engaging claw portions 39c and 39c and between the engaging claw portions 39d and 39d.

When the engaging claw portions 39c, 39d separate from the tooth grooves of the locking gear 33 and the engagement is released, the locking gear 33 becomes rotatable. Accordingly, the sun gear 12c, which is integral with the locking gear 33, also becomes rotatable.

Further, when the driving of the electromagnetic solenoids 37, 37 is stopped, the respective locking pins 38a, 38b stop pressing the engaging claw portions 39c, 39c and 39d, 39d.

Accordingly, the locking levers 39a, 39a and 39b, 39b pivot, with the portions axially supported as the rotational centers, such as to narrow the distances between the engaging claw portions 39c, 39c and the engaging claw portions 39d, 39d, by the energizing force of the spring members 36, 36.

When the engaging claw portions 39c, 39d are engaged with tooth grooves of the locking gear 33, the locking gear 33 becomes prohibited from rotating. Accordingly, the sun gear 12c arranged integrally with the locking gear 33 gets fixed.

The electromagnetic solenoids 37 are connected to a control device 40 (see FIG. 1). Upon reception of a control signal from the control device 40, the respective electromagnetic solenoids 37 drive or stop driving so as to move the locking pins 38a, 38b in move-in or move-out direction.

In other words, in a state that excitation current is not supplied by a control signal from the control device 40, the electromagnetic solenoids 37 do not drive the locking pin 38a or 38b. Accordingly, the engagement state is maintained by the energizing forces of the spring members 36, 36.

In a state that excitation current is supplied by a control signal from the control device 40, the electromagnetic solenoids 37 drive to move the locking pin 38a or 38b in the move-out direction so as to release the engagement state.

In such a manner, the control device 40 drives the two electromagnetic solenoids 37, 37, using the same control signal. It is possible to make the two electromagnetic solenoids 37, 37 simultaneously drive the respective locking pins 38a and 38b to either cause engagement or release engagement of the engaging claw portions 39c, 39c and 39d, 39d, which are at four positions, to or from tooth grooves of the locking gear 33.

Herein, for easy understanding, the electromagnetic solenoid 37, which is shown in the upper portion of FIG. 4, is shown in a state that the engaging claw portions 39c, 39c of the locking levers 39a, 39a are engaged with tooth grooves of the locking gear 33.

On the other hand, the electromagnetic solenoid 37, which is shown in the lower portion of FIG. 4, is shown in a state that the engaging claw portions 39c, 39c of the locking levers 39a, 39a are released from engagement with tooth grooves of the locking gear 33.

Arrangement may be made such that a control signal representing excitation or stoppage of excitation is output from the control device 40 to these two electromagnetic solenoids 37, 37 so that engagement or release of engagement is simultaneously performed.

Using a control signal, the control device 40 makes the engaging claw portions 39c, 39d engage with tooth grooves of the locking gear 33 and can thereby connect the steering shaft 17 located before and after the clutch device 11 and the turning shaft 25 through the planetary gear mechanism 12.

Further, using a control signal, the control device 40 releases engagement of the claw portions 39c, 39d from tooth grooves of the locking gear 33 and can thereby make the steering shaft 17 independent from the turning shaft 25 and make the steering wheel 9 turn into a rotatable state in such a manner.

Problems with SBW System

For some vehicles in recent years, adopted is a steer-by-wire steering system (hereinafter, also referred to as a SBW system) that converts a steering amount, made by a user, of a steering device 7 including a steering wheel 9 and the like into an electrical signal, which flows in a cable, and thereby transmits the steering amount to the steered wheels 3 to make them turn.

In a SBW system, the operation direction and the operation amount, by a user, of a steering handle 9 are converted by a steering device into electrical signals to be given, as a steering will, to a turning device including a turning motor.

The turning device drives the turning motor, according to the electrical signal, and thereby turns the steered wheels, corresponding to the steering will of the user. Steer-by-wire control by an SBW system enables it to easily change the ratio of the turning angle of steered wheels to the rotation of a steering wheel (hereinafter, also referred to as turning ratio), corresponding to the vehicle speed and the like.

Such a SBW system is provided with a backup clutch (hereinafter, also referred to as a clutch device) 11 that directly connects the steering wheel side and the turning device in a case of emergency.

The clutch device 11 performs operation to mechanically cause disconnection or connection between the steering shaft 17 on the side of the steering device 7 and the turning shaft 25 on the side of the turning device 5. The turning device having been thus mechanically separated can turn the steered wheels, according to an electrical signal indicating a steering will.

In the event that abnormality, failure, or the like, of the steering angle sensor 45, a rack position sensor 47, or the like has been detected, the clutch device 11 mechanically connects the steering shaft 17 on the side of the steering shaft 17 and the turning shaft 25 on the side of the turning device 5, so that steering of the steering wheel 9 by the user can be continued.

The clutch device 11 ensures connection between the turning device 5 and the steering device 7, and relative movement such as sliding or slipping is prevented by the connection. Consequently, when the rotational driving of a reaction force motor or a turning motor continues, and the clutch device 11 is connected, it sometimes occurs that inertia of the motor concentrates at the engagement portions of the clutch device 11.

Particularly in a column EPS mode in which the inertia force of the motor of the steering reaction force actuator was added to the operation force of the user, it occurred that stress concentrated at the engagement portions, and the clutch device 11 was thereby broken.

Further, the inside of the clutch device 11 is difficult to be viewed from outside, and it was difficult to recognize the degree of breakage of a component.

Torque Limiter

In this situation, in the present embodiment, as shown in FIG. 1, a mechanical fuse 15, as a later-described torque limiter, is provided between the steering reaction force actuator 13 and the clutch device 11. The mechanical fuse 15 in the present embodiment is arranged at a portion, of the column shaft, corresponding to an intermediate shaft, to connect upper and lower steering joints 41, 42.

Figure 5:
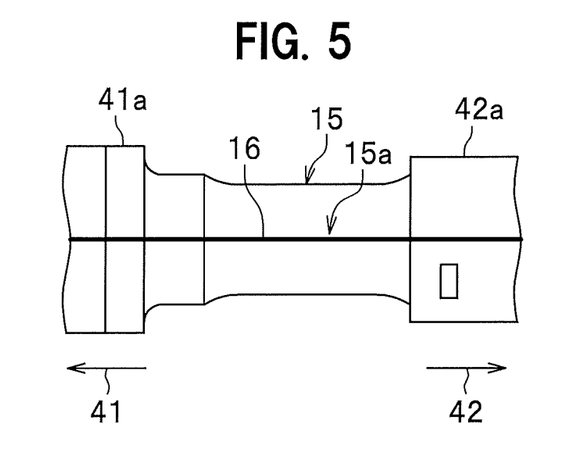
FIG. 5 is a side view of a mechanical fuse, showing a portion on which a scribing line is drawn on the clutch device in the embodiment.

FIG. 5 is a side view of the mechanical fuse 15 of the clutch device 11 in the present embodiment, showing a portion on which a scribing line is drawn as a line for a mark.

In the present embodiment, the mechanical fuse 15 for transmitting a turning force is provided between an input side 41a, to which an upper steering joint 41 is connected, and an output side 42a, to which a lower steering joint 42 is connected.

The mechanical fuse 15 has a substantially cylindrical shape. Herein a substantially central portion in the longitudinal portion thereof is provided with a fragile portion having a smaller diameter compared with the diameters of other portions. In order to prevent a load, which is applied to the clutch device 11, from exceeding a certain load which would cause breakage, there is set a certain allowable torque at which deformation of the mechanical fuse 15 occurs, the deformation starting at this fragile portion.

The allowable torque of the mechanical fuse 15 in the present embodiment is set lower than the strength of the locking levers 39a, 39b. It is possible to estimate the load history applied to the clutch device 11, according to the degree of deformation of the mechanical fuse 15 arranged at a comparatively viewable position between the input side 41a of the upper steering joint 41 and the output side 42a of the lower steering joint 42.

In the present embodiment, the twist allowable torque at which twist deformation of the mechanical fuse 15 occurs is set further lower than the withstand load of the locking levers 39a, 39b and the allowable torque at which breakage of the mechanical fuse 15 occurs.

Accordingly, if a load applied to the mechanical fuse 15 exceeds the twist allowable torque at which twist deformation occurs, then twist deformation, which causes displacement of the relative position with respect to the rotation direction between the input side 41a and the output side 42a, starts, prior to deformations of other portions.

Accordingly, a single scribing line 16 is linearly drawn at a viewable portion of the side surface portion 15a of the mechanical fuse 15 in the present embodiment. The scribing line 16 extends substantially over the total length of the mechanical fuse 15, and is set in parallel along the axial direction, straddling between the input side 41a and the output side 42a such as to connect these.

Figure 6:
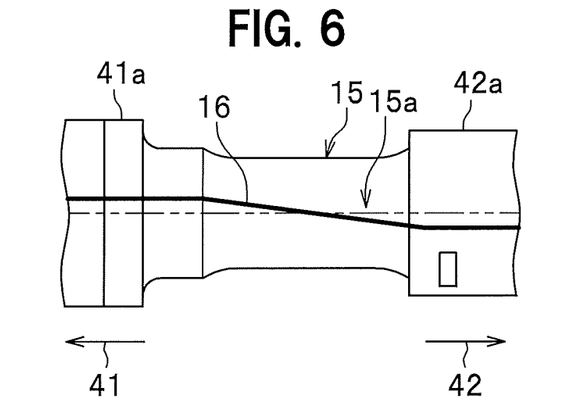
FIG. 6 is a side view of the mechanical fuse with a twist deformation on the clutch device in the embodiment.

FIG. 6 is a side view of the mechanical fuse 15 with a twist deformation on the clutch device 11 in the present embodiment.

When a load exceeding the twist allowable torque is applied to the clutch device 11, the mechanical fuse 15 (see FIG. 1), which is connected between the upper and lower steering joints 41, 42, twists and deforms.

Accompanying the twist deformation of the mechanical fuse 15, the scribing line 16, which is drawn on the side surface portion 15a, also deforms in a twist linear shape.

The scribing line 16 is provided on the viewable side surface portion 15a of the mechanical fuse 15, the side surface portion 15a corresponding to the intermediate shaft of the column shaft.

Accordingly, by viewing the twist degree of the scribing line 16, the user can recognize the history in which a load exceeding the twist allowable torque has been applied.

Furthermore, the amount of the twist deformation of the mechanical fuse 15 of a single time sometimes increases, after deformations of plural times have been accumulated. Such a history of load action of plural times appears as an increase in the twist deformation amount of the scribing line 16.

Accordingly, by viewing the twist degree of the scribing line 16—of the mechanical fuse 15 in the present embodiment, it is possible to estimate, to a certain degree, the load history having been input to the clutch device 11, and thereby possible to determine a maintenance timing of the clutch device 11.

Figure 7:
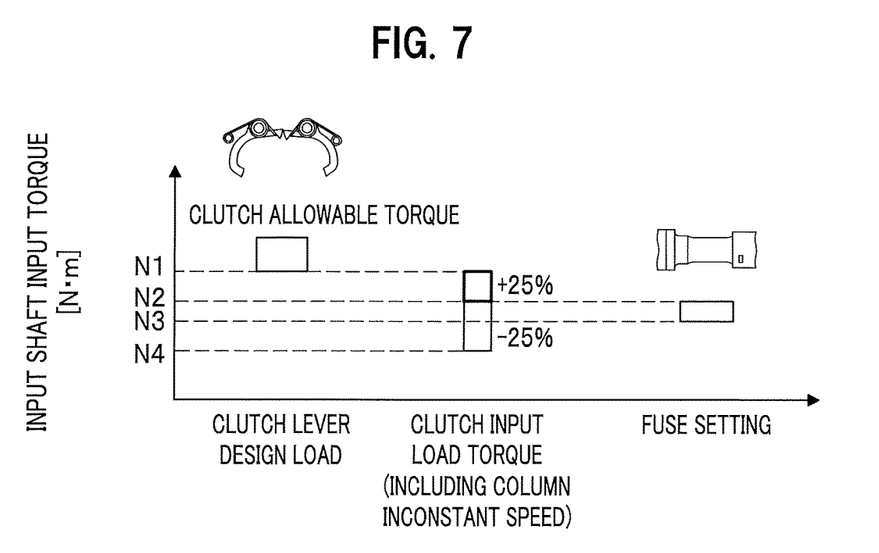
FIG. 7 is a graph illustrating the setting of an allowable torque of the mechanical fuse on the vehicle steering apparatus in the embodiment.

FIG. 7 is a graph illustrating the setting of the allowable torque of the mechanical fuse 15 on the vehicle steering apparatus in the present embodiment.

A clutch allowable torque given as a design load of the locking levers 39*a*, 39*b* of the clutch device 11 in the present embodiment is higher than or equal to, for example, N1 (N·m).

On the other hand, a fuse setting torque that breaks the mechanical fuse 15 is smaller than N1 (N·m), and set to, for example, N2 (N·m)). The clutch allowable torque N1 is preferably higher than or equal to the fuse setting torque N2 by +25%.

A twist allowable torque N3 at which deformation of the mechanical fuse 15 starts is set lower than this fuse setting torque N2 (N·m). Further, depending on a normal turning force N4 (N·m) applied in a manual mode or in a column EPS mode, the twist allowable torque N3 is set to a magnitude at which deformation does not start.

In such a manner, on the vehicle steering apparatus in the present embodiment, the mechanical fuse 15 twists and deforms prior to a breakage of the clutch device 11.

Further, arrangement is made such that the mechanical fuse 15 breaks before a load applied to the clutch device 11 in a locked state exceeds a certain load that breaks the clutch device 11, so that an excessive load is not transmitted to the clutch device 11. Thus, the clutch device 11 can be protected.

Figure 8:
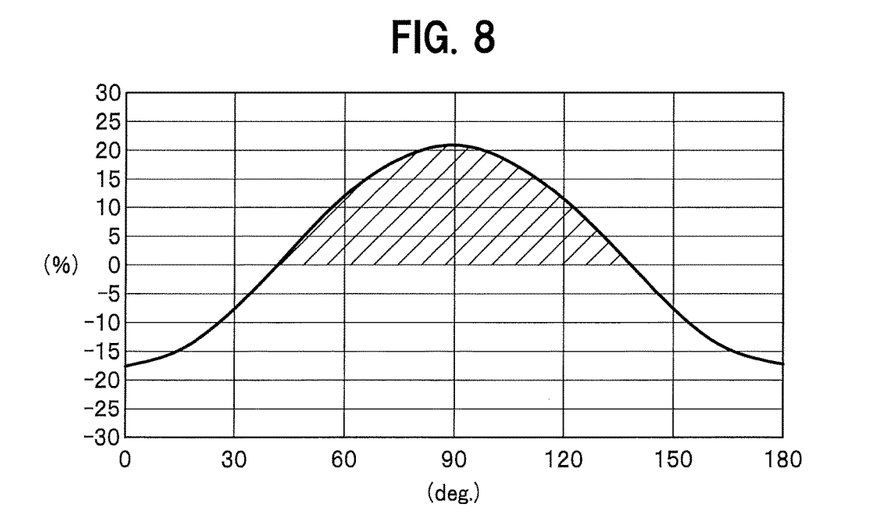
FIG. 8 is a graph illustrating torque variation according to the column geometry of the mechanical fuse on the vehicle steering apparatus in the embodiment.

FIG. 8 is a graph illustrating torque variation according to the column geometry of the mechanical fuse 15 on the vehicle steering apparatus in the present embodiment.

The graph shown in FIG. 8 represents a torque variation value of approximately 25% in the vicinity of the peak. Accordingly, a room of plus and minus 25% is given to the fuse setting torque, wherein torque variation due to the joint angle and torque variation due to variability are taken into account.

Herein, in addition to the fuse setting torque, maximum value 25% of variation due to inconstant column speed is taken into account, in setting the clutch allowable torque. For example, a margin of approximately 25% is set with an assumption that the effect by the joint angle is 22% and the effect by the variability is 3%.

However, without being limited thereto, the amount of room is not particularly limited as long as it is approximately 10-50%, and preferably 20%-30%.

Incidentally, the clutch allowable torque is further preferably set such that a state that the left and right ends of rotation of the steering wheel 9 are hit in the column EPS mode is taken into account.

In this case, in addition to the load input to the steering wheel 9 by the user, the inertia force of the steering reaction force motor 23 for the steering reaction force actuator 13 is applied to the clutch device 11.

Accordingly, compared with a situation of performing steer-by-wire control or a situation of performing the EPS mode, using the turning motor 29 (see FIG. 1) of the turning device 5, the situation becomes into a state that the shear load on the engagement portions becomes the maximum.

Accordingly, it is preferable that a load which enables protection of the clutch device 11 is set, based on the column EPS mode. Further, in the column EPS mode, in order to protect the locking levers 39*a*, 39*b* and the mechanical fuse 15, it is further preferable to use the steering reaction force motor 23, making the output in a deceased state.

In the following, the operations and advantages of the vehicle steering apparatus in the present embodiment will be described.

On the vehicle steering apparatus in the present embodiment according to the invention, if the user rotates the steering shaft 17, using the steering wheel 9 of the steering device 7, the steering angle sensor 45 arranged on the steering reaction force actuator 13 detects the steering angle (see FIG. 1).

Then, corresponding to this detected steering angle, the control device 40 rotationally drives the turning motor 29 arranged on the turning mechanism 31 of the turning device 5, and turns the steered wheels 3, 3 connected to the rack shaft 27 (steer-by-wire control).

Herein, in the clutch device 11, engagement between the engaging claw portions 39*c*, 39*d* of the locking levers 39*a*, 39*b* and the locking gear 33 is released by the electromagnetic solenoids 37, 37 (see FIG. 2). Accordingly, the sun gear 12*c* arranged integrally with the locking gear 33 is rotatable so that it does not occur that the rotation of the steering wheel 9 is directly transmitted to the turning shaft 25.

Further, if a failure or the like occurs on at least one of the steering angle sensor 45 and the rack position sensor 47, and abnormality is detected by the control device 40, the control device 40 performs connection by the clutch device 11 and stops the steer-by-power control.

In other words, on the clutch device 11, corresponding to a control signal, the electromagnetic solenoids 37, 37 engage the locking levers 39*a*, 39*b* and the locking gear 33 so as to stop the rotation of the sun gear 12*c* arranged integrally with the locking gear 33.

Accordingly, the rotation of the steering wheel 9 is transmitted to the turning shaft 25, through the steering shaft 17, the ring gear 12*a*, the planetary gears 12*b*, and the planetary carrier member 12*d* of the clutch device 11, being decelerated before reaching the turning shaft 25 (see FIG. 3).

The rotation of the turning shaft 25 is converted into a linear motion of the rack shaft 27 to directly turn the steered wheels 3, 3 connected to the rack shaft 27.

Herein, the steering force from the steering wheel 9 is assisted by the driving force of the steering reaction force motor 23, and the mode thereby turns into the column EPS mode.

In the column EPS mode, similarly to the manual mode, the engaging claw portions 39*c*, 39*d* of the locking levers 39*a*, 39*b* of the clutch device 11 are respectively engaged with tooth grooves of the locking gear 33 so that the locking gear 33 is fixed not to rotate.

In the present embodiment, the engaging claw portions 39*c*, 39*c* and 39*d*, 39*d* are made engaged, at four positions, with tooth grooves of the locking gear 33 to fix the sun gear 12*c*. The engaging claw portions 39*c*, 39*d* formed such as to fit with tooth grooves between tooth portions get engaged such that the tip ends thereof are inserted into tooth grooves, being moved from the outside to the inside in the diameter direction. Thus, the steering device 7 and the turning device 5 are ensured to be connected with each other.

However, the rotational steering force from the steering device 7 acts on the engagement portions between the engaging claw portions 39*c*, 39*d* and the tooth portions, on the both sides, of tooth grooves, as shear force in the circumferential direction.

Accordingly, the tip ends of the engaging claw portions 39*c*, 39*d*, in a curved hook shape, of the locking levers 39*a*, 39*b* sometimes get broken if shear stresses higher than a predetermined value exceeding a design strength are applied to the above-described tip ends. Breakage of the lock levers

39a, 39b is invisible from outside and affects the steering of the steered wheels 3. Accordingly, it is necessary to protect the clutch device 11 before the engagement portions get damaged.

In this situation, in the present embodiment, as shown in FIG. 1, the mechanical fuse 15 having the scribing line 16 is connected between the steering wheel 9 and the clutch device 11. If a load higher than or equal to a predetermined value acts between the steering device 7 and the turning device 5, the mechanical fuse 15 twists and deforms, and breaks to absorb energy. Thus, it is possible to prevent that a shear stress exceeding the clutch allowable force is transmitted to the clutch device 11.

In such a manner, by arranging the mechanical fuse 15 between the steering device 7 and the clutch device 11, protected are the locking levers 39a, 39b and the tooth grooves of the locking gear 33, which are inside the clutch device 11, against the shear load in the circumferential direction applied from the steering device 7 to the clutch device 11.

However, particularly in the column EPS mode, there are cases that the inertia of the steering reaction force motor 23 is added to the steering force of the user; and a load, which exceeds a load at which twist deformation of the mechanical fuse 15 starts and does not causes breakage, intermittently acts plural times. In such a case, the deformation amount of the mechanical fuse 15 gradually becomes larger. Then, even after twist deformation by the respective loads and in a state the twist remains, the steering force of the steering wheel 9 can be continuously transmitted to the turning device 5. Consequently, the user can hardly recognize that an overload state has occurred.

The vehicle steering apparatus in the present embodiment is provided with the scribing line 16 on the side surface portion 15a of the mechanical fuse 15 (see FIG. 5). The scribing line 16 is arranged at a visible position such as to straddle between the input side 41a and the output side 42a.

For example, when a load that is not so high as to break the mechanical fuse 15 and exceeds a preset withstand twist load, the mechanical fuse 15 twists and deforms (see FIG. 6).

In this state, the scribing line 16 also twists and curves and remains as a history. This history becomes larger with the increase in the number of times of application of loads exceeding the twist load. Accordingly, by viewing the thus twisted and curved scribing line 16, the user can determine whether or not the mechanical fuse 15 has a history in which excessive load has been applied thereto.

Further, when twist deformation caused by loads exceeding the withstand twist load of the mechanical fuse 15 grows, the mechanical fuse 15 breaks. For the vehicle steering apparatus in the present embodiment, the fuse setting torques is set lower than the allowable clutch torque of the clutch device 11.

Accordingly, as the mechanical fuse 15 twists and deforms before the clutch device 11 breaks, breakage can be predicted from the history of the scribing line 16.

Modification

Figure 9:
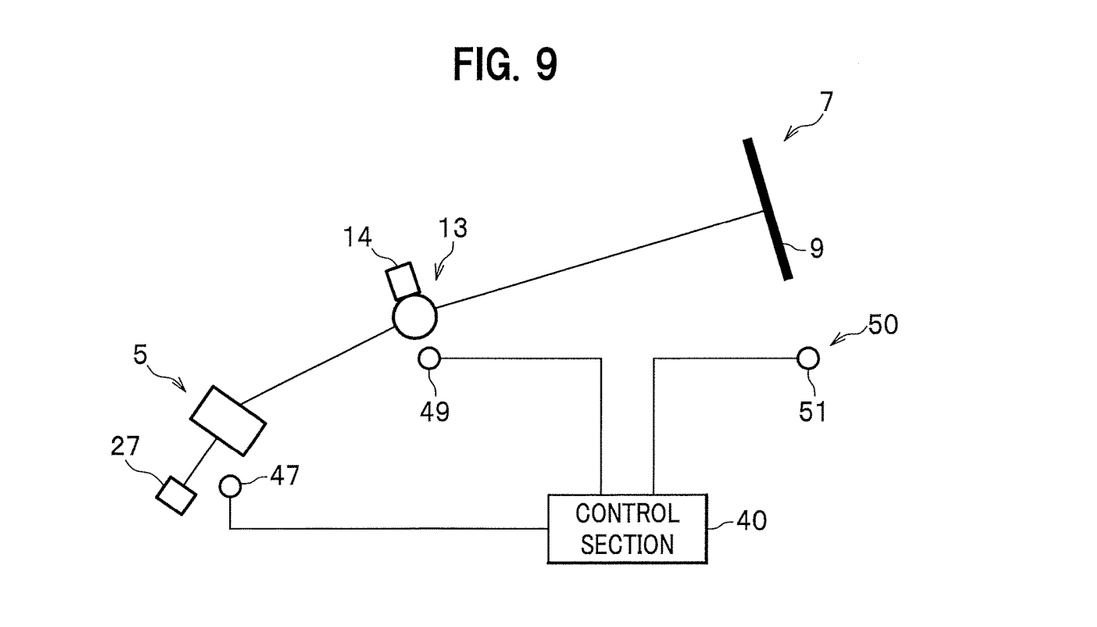
FIG. 9 is a schematic cross-sectional view of main portions on a vehicle steering apparatus in a modification.

FIG. 9 is a schematic cross-sectional view of main portions of a vehicle steering apparatus in a modification of the present embodiment. Incidentally, the same symbol is given to the each same or equivalent portion as in the above-described embodiment, and the description will be omitted.

On the vehicle steering apparatus in this modification, the steering reaction force actuator 13 of the steering device 7 is provided with a motor torque limiter 14 as a torque limiter.

For the motor torque limiter 14, a limit value of fastening is set to a certain value as a withstand load, similarly to the fuse setting torque of the mechanical fuse 15. If a load exceeding this limit value is applied, the motor torque limiter 14 prevents, by a sliding or slipping function or the like, a load exceeding the withstand load from being transmitted to the clutch device 11, and thereby limits a force applied from the motor.

In this modification, the withstand load of the motor torque limiter 14 is set to be lower than the withstand load of the locking levers 39a, 39b.

Accordingly, the motor torque limiter 14 operates before the clutch device 11 breaks. Then, by this operation of the motor torque limiter 14, the load is lost so that it is prevented that a load exceeding the withstand load is applied to the clutch device 11.

Further, the rack shaft 27 of the turning device 5 is provided with a rack position sensor 47. The steering angle sensor 45 and rack position sensor 47 are connected with the control device 40.

In the event that abnormality such as a failure has occurred on either one of the steering angle sensor 45 and the rack position sensor 47, the control device 40 detects the abnormality.

Upon detection of abnormality, the control device 40 stops steer-by-wire control performed by the SBW system, and performs connection by the clutch device 11 to change the mode to the manual mode or the column EPS mode.

Further, the vehicle steering apparatus in the modification is provided with a warning device 50 for warning in the event that the output value (measured current intensity 61) of the steering reaction force actuator 13 as a load has exceeded a predetermined condition. The warning device 50 is arranged such as to perform warning for notification of the timing of replacement by lighting a warning lump 51 arranged in the vicinity of the driver's seat (see FIG. 1).

Figure 10:
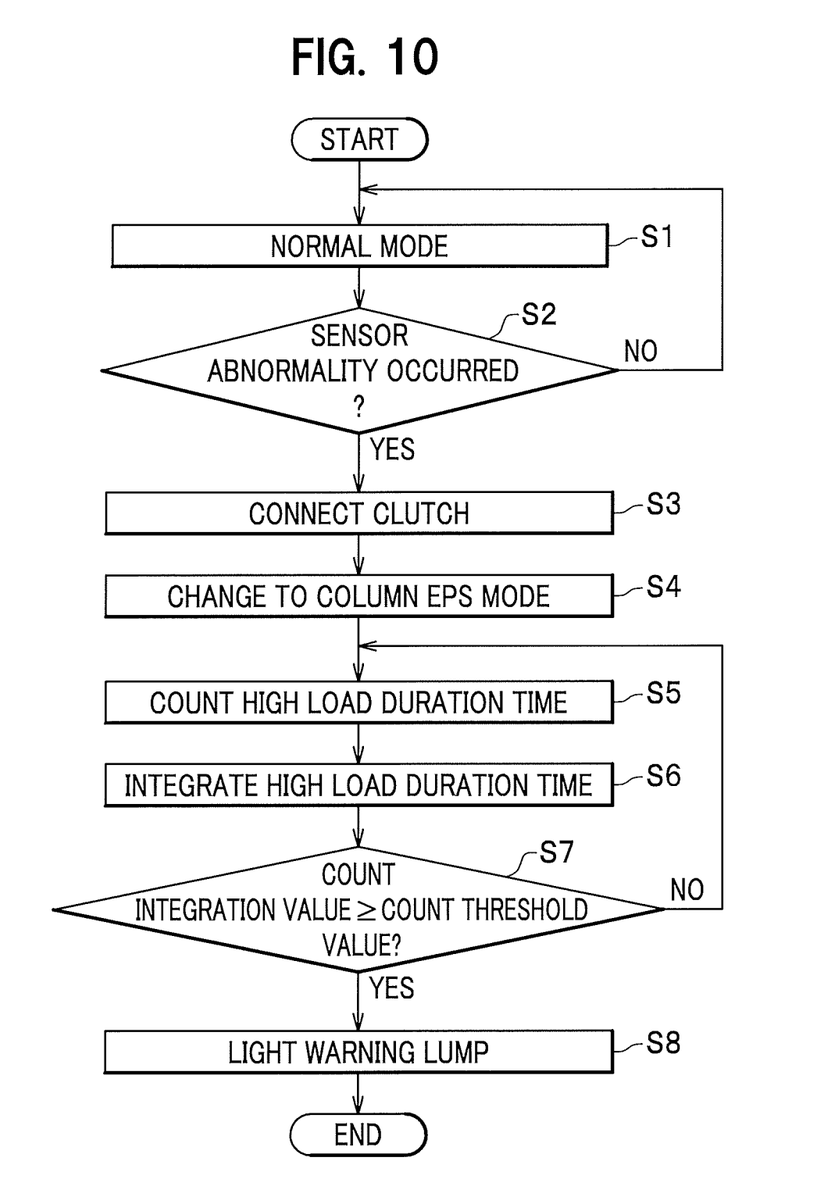
FIG. 10 is a flowchart illustrating the integration process of load applied to a torque limiter on the vehicle steering apparatus in the modification.

FIG. 10 is a flowchart illustrating the integration process of loads applied to the torque limiter on the vehicle steering apparatus in the modification.

Upon start of the control device of the vehicle 1, in step S1, control in a normal mode is started by steer-by-wire control by the control device 40.

In step S2, the control device 40 determines whether or not at least one of the steering angle sensor 45 and the rack position sensor 47 is in a failure.

In step S2, if a failure is not detected, the normal mode is continued (No in step S2). If abnormality or failure has occurred on at least one of the steering angle sensor 45 and rack position sensor 47, the process proceeds to step S3 (YES in step S2).

In step S3, by the use of the clutch device 11, the lower steering joint 42 and the turning shaft 25 are connected.

In step S4, the control of the steering apparatus carried out by the control device 40 is changed from the control in the normal mode by steer-by-wire control to the control in the column EPS mode. In the column EPS mode, the steering force from the steering wheel 9 is assisted by the driving force of the steering reaction force motor 23. On this occasion, in the column EPS mode for protecting the clutch device 11, the driving force of the steering reaction force motor 23 may be limited.

In step S5, the control device 40 counts the duration time in which a high load state continues.

In step S6, based on the counted duration time, integration is performed. A computation result of the integration is held for a certain time by a memory or the like, as a count integration value.

Herein, the time of a state, in which the current intensity 61 of the steering reaction force motor 23 is higher than or equal to a preset value, is measured. However, without being limited particularly thereto, for example, the current value of the steering reaction force motor 23 may be integrated. Further, in a case that the integrated value becomes huge as a data amount, the number of times when the current value has become equal to or higher than a preset value may be used.

In step S7, it is determined whether or not the count integration value exceeds a certain count threshold value.

In step S7, if the count integration value does not exceed the count threshold value, the process returns to step S5, and counting is continued (NO in step S7).

In step S7, if the count integration value exceeds the count threshold value, the process proceeds to step S8, and the warning lump 51 is turned on (YES in step S7).

Operations and advantages in the modification will be described below.

In this modification, in addition to the operations and advantages in the above-described embodiment, if a shear load exceeding a certain value, it is possible to operate the motor torque limiter 14 and prevent the shear load from being transmitted to the clutch device 11.

Further, before the clutch device 11 breaks, if a shear load higher than or equal to the certain value continues to be applied to the motor torque limiter 14, the warning device 50 performs warning by lighting the warning lump 51. By viewing the lighting of the warning lump 51, the user can recognize a symptom of occurrence of a failure.

Accordingly, it is possible to predict a failure and carry out replacement of a component.

Other structures, operations and advantages are the same as or equivalent to those in the vehicle steering apparatus in the above-described embodiment, and description thereof will be omitted.

The present invention is not limited to the above-described embodiment, and various changes and modifications can be made. The above embodiment has been described as examples to make the invention understandable, and the invention is not limited to embodiments including all the described elements. Further, a part of the structure of a certain embodiment can be replaced by a part of the structure of another embodiment, and further, it is also possible to add the structure of another embodiment to the structure of a certain embodiment. Still further, it is also possible to delete a part of the structures of respective embodiments or add/replace other structures. Changes and modifications possible on the above-described embodiments are for example as follows.

On the vehicle steering apparatus in the present embodiment, as a viewable line, the scribing line 16 connecting the input side 41*a* and the output side 42*a* is drawn linearly along the axial direction, on a viewable portion of the side surface portion 15*a* of the mechanical fuse 15.

However, without being limited thereto, as long as a viewable line is provided, straddling between the input side 41*a* and the output side 42*a* of the mechanical fuse 15 such that twist of the mechanical fuse 15 is determinable, the line can also be drawn for example by marking or the like, and the drawing method is not limited particularly to the scribing line 16 in the present embodiment. Further, the shape of the line also is not limited to a line along the axial direction. The line can be oblique to the axis, and also can be drawn in any shape, quantity, and thickness, for example, such as to be a polygonal line, a curved line, a line of combination of such lines, or the like.

Further, the vehicle steering apparatus in the present embodiment is structured in such a manner that if a failure or the like has occurred on at least one of the steering angle sensor 45 and the rack position sensor 47 and abnormality is detected by the control device 40, the control device 40 performs connection by the clutch device 11 to stop steer-by-wire control.

However, without being limited particularly thereto, for example, a turning angle sensor may be used instead of the rack position sensor 47, or the control device 40 may be configured such as to stop steer-by-wire control by performing connection by the clutch device 11 if abnormality or failure is detected by another kind of sensor such as a steering torque sensor.

Further, the vehicle steering apparatus in the present embodiment has been explained by description of the clutch device 11 controlling the planetary gear mechanism 12 by the locking device 35. However, without being limited to one that performs switching between the steering device 7 and the turning device 5 by electrical control, the clutch device 11 may be one that mechanically performs switching between the steering device 7 and the turning device 5.

For example, the clutch device 11 may be one that electrically performs switching control by the control device 40 and mechanically switches between disconnection and connection of the steering device 7 and the turning device 5. using a different kind of actuator such as an electromagnet, a linear solenoid, or the like. Accordingly, the clutch device 11 can be any one that mechanically performs operation to cause the connection state or the disconnection state, and the shape, the structure, the quantity of joined elements, the control, nor the disconnection-connection structure is not particularly limited.

Further, in the modification, the warning device 50 performs warning by lighting the warning lump 51 before the clutch device 11 breaks. However, without being particularly limited thereto, for example, the warning device may also be one that performs warning by alarm, sound, display using a monitor or the like, or a combination of these. Still further, without being limited to one in which the scribing line 16 is drawn on the mechanical fuse 15 as in the above embodiment, deformation of the mechanical fuse 15 may be recognized by the warning device 50 for warning by lighting the warning lump 51.

Yet further, in the modification, as an example where the load becomes higher than or equal to a certain condition, description has been made by taking an example in which time, during which the current value of the steering reaction force motor 23 is higher than or equal to a predetermined value, is counted and integrated by the control device 40. However, without being limited thereto, using a torque sensor, by counting duration time of a state where the load is high, a replacement timing, when the integration value of the load becomes larger than or equal to a certain condition, may be computed.

Further, the above-described embodiment and the modification have been explained by description of ones in which the portion corresponding to the intermediate shaft and the steering reaction force actuator 13 are provided with the mechanical fuse 15 and the motor torque limiter 14.

However, without particularly being limited thereto, for example, the clutch device 11 or the like may be provided with a torque limiter. In other words, as long as a torque limiter is arranged between the steering reaction force actuator 13 and the clutch device 11, the torque limiter may be arranged at any position. Further, plural torque limiters may be provided, or both the mechanical fuse 15 and the motor torque limiter 14 may be used.

The measured current intensity 61 of the steering reaction force actuator 13 is used for determining whether a load has become higher than or equal to a predetermined condition. In place of the measured current intensity 61, a calculated drive current value to drive the steering reaction force actuator 13 may be used.

The present invention provides a vehicle steering apparatus, including:

a turning device 5 including a turning mechanism 31 that turns steered wheels of a vehicle; and a turning motor 29;

a steering device 7 including a steering wheel 9 and a column-side force actuator (steering reaction force actuator 13) that generates a steering reaction force in response to user's steering of the steering wheel 9 in a disconnection mode (steering-by-wire mode) and generates a steering assist force in a connection mode (column-electric-power-steering);

a clutch device 11 that disconnects the turning device 5 from the steering device in the disconnection mode and connects the steering device 7 to the turning device 5 in the connection mode to transmit the steering force on the steering wheel 9 to the turning device 5, the turning motor 29 applying a turning force to the turning mechanism 31 in response to steering on the steering wheel (using a steering angle sensor 45) in the disconnection mode; and a torque limiter disposed between the steering device 7 and the clutch device 11 that limits a stress (load) caused by the steering force.

What is claimed is:

1. A vehicle steering apparatus, comprising:
   a turning device that turns steered wheels of a vehicle;
   a steering device including a steering reaction force actuator that applies a reaction force to user's steering of a steering wheel;
   a clutch device that performs operation to mechanically cause a connection state or a disconnection state between the steering device and the turning device; and
   a torque limiter disposed between the steering reaction force actuator and the clutch device.

2. The vehicle steering apparatus according to claim 1, wherein the torque limiter comprises a mechanical fuse that connects the steering reaction force actuator and the clutch device.

3. The vehicle steering apparatus according to claim 2, wherein the mechanical fuse has a viewable line such that the line straddles between an input side and an output side of steering force.

4. The vehicle steering apparatus according to claim 1, wherein the torque limiter comprises a motor torque limiter disposed in the steering reaction force actuator.

5. The vehicle steering apparatus according to claim 1, further comprising:
   a warning device that performs warning when a load is equal to or higher than a predetermined condition.

6. The vehicle steering apparatus according to claim 5, wherein the warning device performs the warning by lighting a warning lamp.

* * * * *